(No Model.) 2 Sheets—Sheet 1.
S. ELLIOTT.
FLEXIBLE TIRE AND RIM FOR WHEELS.
No. 527,781. Patented Oct. 23, 1894.
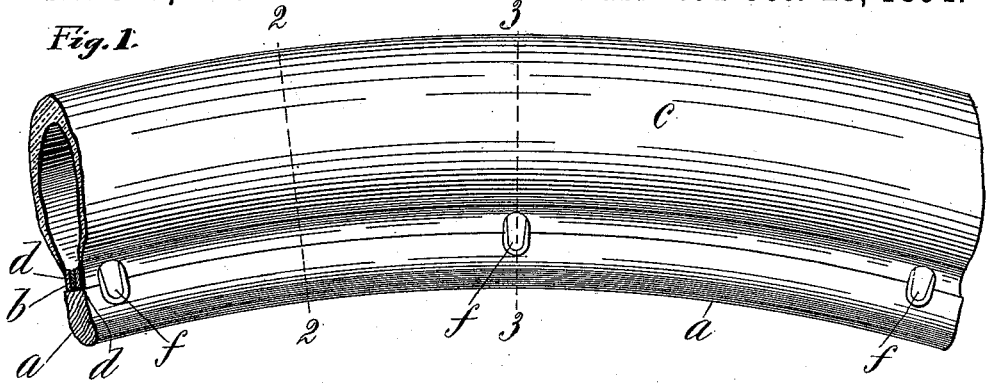
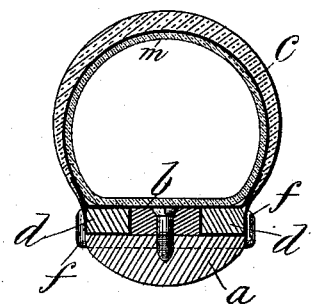
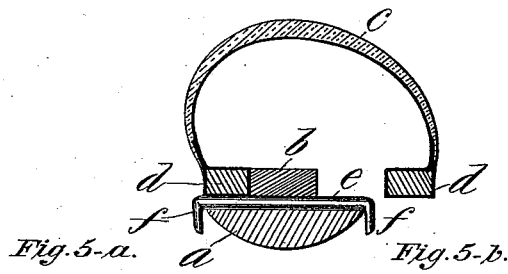
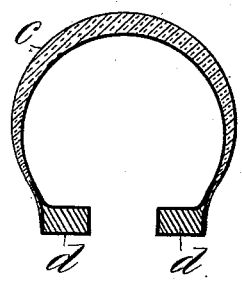
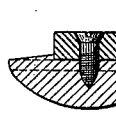
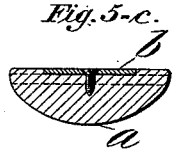
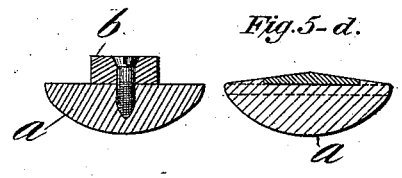
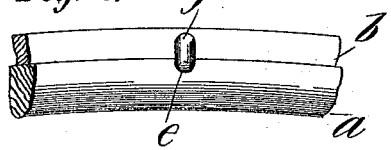
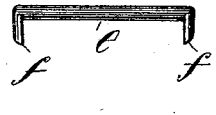
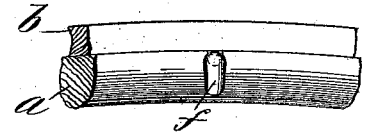
Witnesses:
E. M. Taylor.
M. Gibson.
Inventor:
Sterling Elliott
By Redding & Kiddle
Attys.
THE NORRIS PETERS CO., PHOTO-LITHO., WASHINGTON, D. C.

(No Model.) 2 Sheets—Sheet 2.
S. ELLIOTT.
FLEXIBLE TIRE AND RIM FOR WHEELS.
No. 527,781. Patented Oct. 23, 1894.
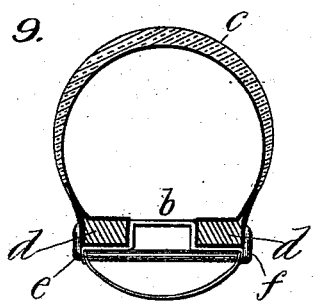
Fig. 9.
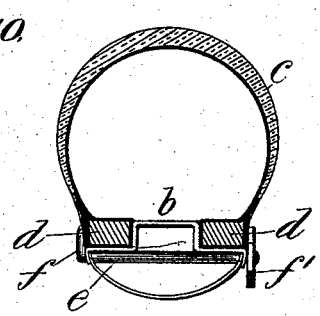
Fig. 10.
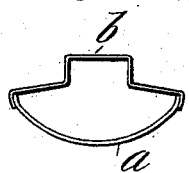
Fig. 11-a
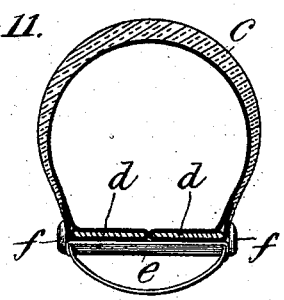
Fig. 11.
Fig. 11-b.
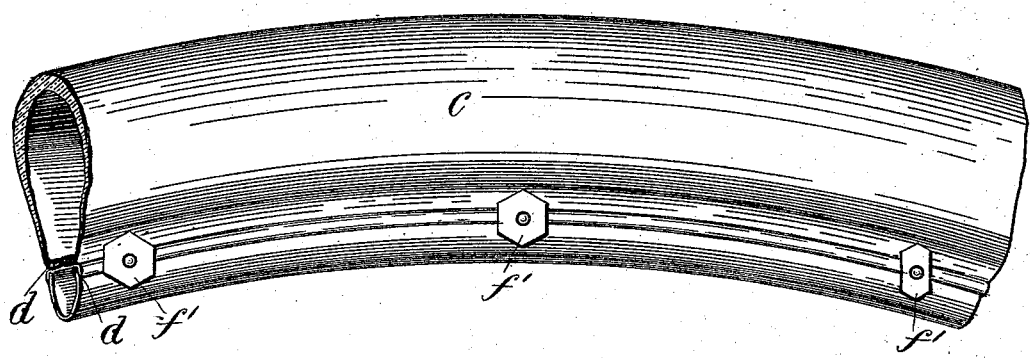
Fig. 12.
Fig. 13.
Witnesses:
E. M. Taylor.
M. Gibson.
Inventor:
Sterling Elliott
By Redding & Kiddle
Attys.

UNITED STATES PATENT OFFICE.

STERLING ELLIOTT, OF NEWTON, MASSACHUSETTS, ASSIGNOR TO THE POPE MANUFACTURING COMPANY, OF PORTLAND, MAINE, AND HARTFORD, CONNECTICUT.

FLEXIBLE TIRE AND RIM FOR WHEELS.

SPECIFICATION forming part of Letters Patent No. 527,781, dated October 23, 1894.

Application filed January 8, 1894. Serial No. 496,053. (No model.)

*To all whom it may concern:*

Be it known that I, STERLING ELLIOTT, a citizen of the United States, and a resident of Newton, county of Middlesex, State of Massachusetts, have invented certain new and useful Improvements in Flexible-Tired Wheels, of which the following is a specification, reference being had to the accompanying drawings, forming part hereof.

This invention relates to flexible tires for wheels, and to the rims, and means for attaching the tires to the rims.

The invention is especially adapted for use on bicycles and similar vehicles.

One of the objects of this invention is to provide for rapid attachment and removal of the tire for purposes of repair or replacement.

Another object is to provide for rapid insertion and removal of the inner tube of a tire having an outer sheath or cover and an inner inflatable tube.

Other objects are to provide a tire that will be firmly held in position and will not creep upon the rim, and will hold together when deflated, and may be used in an emergency when deflated, and will be of simple construction and strong and durable.

In the accompanying drawings, to which I will now refer: Figure 1 is a side elevation showing a portion of a tire, a rim and retaining device embodying my invention. Fig. 2 is a transverse section of the same on the line 2—2; and Fig. 3 is a transverse section on the line 3—3, showing one edge of the outer sheath or cover disengaged from the rim. Fig. 4 is a detached transverse section of the cover or sheath, and Fig. 5 is a detached transverse section of the rim. Figs. 5$^a$, 5$^b$, 5$^c$ and 5$^d$ are similar views showing modifications in the construction of the rim. Fig. 6 is a detached elevation of the hook or fastening device, and Figs. 7 and 8 are side elevations showing portions of the rim and one fastening hook, the hook being in engaging position in Fig. 7 and in disengaged position in Fig. 8. Fig. 9 is a transverse section of a sheath or cover, a rim and a fastening device, showing modifications in the construction, and Figs. 10 and 11 are similar views showing other modifications. Figs. 11$^a$ and 11$^b$ are transverse sections of the rim showing further modifications in construction. Fig. 12 is a side elevation of a portion of the rim and fastening device as shown in Fig. 10. Fig. 13 shows transverse sections of several modifications in the construction of the inextensible band to be inserted in or secured to the edges of the sheath.

In the embodiment of my invention shown in Figs. 1, 2, 3, 4, 5, 6, 7 and 8 the rim $a$ is of wood or like material and has a cylindrical outer surface or periphery, that is to say, a curved flat surface or a surface the development of which is a flat surface and which is therefore frequently referred to as a flat surface, while its inner periphery is suitably rounded or otherwise shaped to secure lightness, strength or pleasing appearance. The cylindrical character of this outer periphery of the rim $a$ may be to some extent departed from as indicated in Figs. 5$^a$, 5$^b$, 5$^d$, 11$^a$ and 11$^b$, where said surface is slightly inclined or conical and said rim may be made of one or more pieces of wood or metal, and is shown as made of metal in Figs. 9, 10, 11, 11$^a$, 11$^b$ and 12.

Upon the rim $a$ is fitted and secured a medial ridge or band $b$. This medial ridge performs a useful function, but in some cases may be dispensed with, as shown in Figs. 5$^b$, 11, 11$^b$ and 12 and it may be struck up as a portion of the rim, as shown in Figs. 9, 10 and 11$^a$ or otherwise made in one piece with the rim or a portion of the rim, or may be made as a band fitted in the rim as shown in Figs. 5$^c$ and 5$^d$, and may be of various shapes. This medial band or ridge may be glued or otherwise held in place or may be held by screws as shown. In some constructions this band or ridge covers up and protects the tire from abrasion by the spoke heads and acts to retain the fastening devices in place. This band or ridge also serves to form a smooth bearing surface for the inner tube.

The flexible portion of the tire in the embodiment of my invention shown in the drawings comprises an outer sheath or cover $c$ and an inner inflatable tube $m$. The inner tube is of ordinary construction and therefore need not be particularly described and is shown only in Fig. 2.

The flexible tire sheath or cover $c$ shown in the drawings is circumferentially opened on its inner side, this opening being so wide in some constructions as to make it practically a U-shaped tire; and inextensible bands d d are inserted in, engaged with or secured to the edges of this tire sheath so as to make said edges circumferentially inextensible preferably by extending an inner canvas lining of the sheath around said bands, as shown, and said bands d d are hoop-shaped and adapted to fit upon the rim. These bands d d may be of wood or metal, or other suitable substance, or the edges of the sheath may be hardened or stiffened in any desired manner, but the bands or edges must be of such character, strength and stiffness that they will not in use become materially stretched or extended in a circumferential direction around the wheel, and they are usually fitted quite tightly upon said rim. They are preferably rectangular in cross-section and may be solid or hollow, and may be flat or cylindrical, or of various shapes, (four different shapes being shown in Fig. 13 and flat bands being shown in Fig. 11,) and they are preferably of such dimensions that they will cover the portions of the rim on either side of the medial ridge b and will form with said medial ridge b a substantially cylindrical or curved flat surface constituting a smooth bed for the inner tube, as shown in Figs. 2, 9 and 10. As these bands or edges are inextensible, the only direction in which they can be moved on and off the rim is a lateral direction, and fastening means are provided, constructed so as to engage with these bands or edges to prevent the bands or edges from laterally moving off the rim and so as to be moved out of engagement with the bands or edges to enable them to be moved laterally off the rim. These fastening means may be provided on one or both sides of the tire, and may be of various constructions. The fastening means shown in Figs. 1 to 12 inclusive are pivoted devices or latches mounted on or in the rim as the rods e having hooks f (particularly shown in Figs. 6, 7 and 8) and these rods e are pivotally mounted in transverse grooves in the rim a and are held from radial outward movement by the medial ridge or band b, and the hooks f are so shaped that when turned up in outward position, as shown in Figs. 2 and 7 they overlie the edges or bands d of the sheath or cover, and when turned down in inward position as shown in Figs. 3 and 8, they are disengaged from said edges or bands d so that the edges or bands may be moved off the rim. The connections of these fastening devices with the rim have fixed circumferential positions on the rim, and cannot be caused to move or creep around the rim, but will each maintain always the same position circumferentially. The number of these devices upon the wheel may be varied according to the diameter of the wheel, the work to be done by it and pressure of the air in the tube, and the stiffness against lateral pressure of the bands d. The pressure of confined air in the inner tube tends to move these bands or edges d laterally outward and thus causes considerable pressure against the retaining or fastening devices which holds them tightly in place and causes them to so tightly engage with the edges or bands d that no creeping of the tire upon the rim can possibly occur.

One modification of the construction of the retaining device is effected by inserting the rod e in a hole in the rim instead of a slot in which case a hook f is formed on but one end of the rod, while at the other end a nut f' is screwed on the rod and constructed so as to embrace the band or edge d. (See Figs. 10 and 12.) These nuts f' may be hexagonal so that they must be removed to disengage the band or edge d or may be of elongated shape so as to disengage the tire upon being turned a fraction of a revolution, both constructions being shown in Fig. 12, or may be otherwise suitably shaped and may be riveted or otherwise secured upon the rod.

In the use of a tire having an inflatable tube it sometimes happens that the tube becomes deflated while the vehicle is on the road. In such an emergency all the parts of my tire will hold together and maintain their positions without creeping, since there is not only the friction of the edges or bands of the sheath upon the rim, but also that between these edges or bands and the retaining devices, while the cylindrical bed for the inner tube and the construction of the sheath permit the wheel to be employed when the tube is deflated without injury to any part.

From the above description it will be evident that my improved device for holding the tire to the rim is operated independently of the movement of the tire so that no bending or change of position of the tire is necessary in its disengagement and the tire is held firmly and immovably in place until the retaining device or devices have been released. Another feature of the construction is that the inextensible edges of the tire are fitted and supported directly upon the rim of the wheel so that any tendency to creeping of the tire is resisted by the friction of these inextensible edges upon the rim.

The drawings do not show the valve cot for the inner tube for the reason that this valve cot may be of any suitable construction. The medial band or ridge b will be perforated or cut away and the rim will be perforated for this valve cot. It will be evident that at any place where there is an extra thickness in the material of the inner tube, as about the valve cot, the medial band may be cut away so that when in use at any time and especially when the tire is deflated, the medial band will accommodate these irregularities and the tire will rotate smoothly with a substantially uniform working radius.

When access to or removal of the inner tube is desired the valve is opened and the tube partially or wholly deflated so that the lateral pressure upon the retaining devices is relieved and then the retaining devices are moved out of engagement with the inextensible edges of the sheath. One or both of these edges may then be moved off the rim. If any difficulty is experienced in taking off these edges by reason of their adhesion to the rim or from other causes, it is only necessary to slightly inflate the inner tube, whereupon an outward pressure will be developed that will push off the edge or edges of the sheath.

The manner of assembling the parts of my improved tire will be readily understood. Where the rim has the medial ridge $b$ the rim with the medial ridge attached thereto may be inserted within the sheath by slightly changing the circular contour of one of the inextensible edges $d$ to an elliptical contour, that is to say, by increasing the diameter at one point and in consequence thereof correspondingly decreasing it at another point, and inserting the rim within the edge of the cover in such manner that its widest portion passes through the portion of the edge $d$ sprung to greatest diameter. After the rim has been inserted within the sheath, the inner tube may be inserted and the edges of the sheath placed upon the edges of the rim, and the retaining devices moved into engagement with said edges. It will be evident that the various parts of the tire may be readily separated and any part repaired or replaced, and the separation and replacement require no special tools nor higher degree of skill in manipulation beyond that possessed by the ordinary user of bicycles and similar vehicles.

The construction may be modified without departing from my invention by using a solid or cushion flexible tire or a single tube inflatable or pneumatic tire, or other constructions of inner inflatable tube and outer sheath tires, said tires, single tubes or outer sheaths having circumferentially inextensible portions supported upon the rim, in connection with my improved retaining devices; or but one edge of the cover or sheath may be detachable, in which case the other edge may or may not be inextensible and may be suitably secured to the rim, as access may be had to the inner tube by the removal from the rim of but one edge of the cover or sheath; or the fastening devices may be carried upon the tire and adapted to engage with the rim instead of being carried by the rim, and parts of my invention may be employed separately and in combination with other parts of different constructions. I do not therefore limit my invention to the specific constructions shown.

What I claim, and desire to secure by Letters Patent, is—

1. In a wheel the combination of a rim, a flexible cover or sheath and an inner inflatable tube, said cover or sheath being opened circumferentially and having circumferentially inextensible edges supported upon said rim and said rim having a ridge extending outward between said edges so as to form with said edges a bed for the inner tube, and means adapted to engage with said rim and with the inextensible edges of the cover or sheath to securely hold said edges from moving laterally off the rim and to be moved out of engagement with said edges to permit them to be displaced or removed, substantially as set forth.

2. In a wheel the combination of a rim, a flexible cover or sheath, and an inner inflatable tube, said cover or sheath being opened circumferentially and having circumferentially inextensible edges fitted and supported directly upon the outer periphery of said rim, and a medial band or ridge upon said rim between said edges having its outer periphery flush with the outer peripheries of said edges so that said edges and ridge form a substantially continuous bed for the inner tube, and means adapted to engage with said rim and with the inextensible edges of the cover or sheath to securely hold said edges from moving laterally off the rim and to be moved out of engagement to permit the said edges to be displaced or removed, substantially as set forth.

3. In a wheel a rim for a flexible tire provided with a medial band or ridge and having the portions of its outer periphery on each side of said medial band or ridge adapted to support said tire and carrying devices located in different fixed positions around its circumference and adapted to engage with the tire at different points around its circumference to hold said tire from moving laterally off the rim without restricting its movement radially and to be disengaged from said tire to permit its removal from the rim, substantially as set forth.

4. In a wheel a rim for a flexible tire having a medial band or ridge and suitable surfaces to receive the edges of said tire, and fastening devices each comprising a rod transversely mounted in said rim and held from outward movement by said medial band or ridge and having engaging parts mounted on or forming part of said rod and adapted to hold one or both edges of said tire from moving off the rim, substantially as set forth.

5. In a wheel the combination of a rim, an outer cover or sheath, and an inner inflatable tube, said cover or sheath being opened circumferentially and having circumferentially inextensible edges supported upon said rim, and said rim having a medial band or ridge between said edges of the cover or sheath, and fastening devices each comprising a rod mounted in a groove in said rim and held from outward movement by the ridge or band of the rim, and each of said fastening devices also comprising an engaging part or parts mounted on or forming part of the said rod and constructed to prevent the lateral outward movement of one or both of said edges of the cover and to be moved out of engagement with said edge or edges to enable the tire to be displaced or removed, substantially as set forth.

6. In a wheel the combination of a rim, a cover or sheath and an inner inflatable tube, said cover or sheath being opened circumferentially on its inner side and having inextensible bands inserted in or engaged with its edges and said bands being fitted and supported upon said rim, and said rim having a medial band or ridge extending outward so as to be flush with the outer periphery of the inextensible edges of the cover or sheath so that said bands of the cover and the band or ridge of the rim present a substantially cylindrical bed for the inflatable inner tube, and suitable fastening devices for preventing the bands of the cover from moving laterally off the rim, substantially as set forth.

7. In a wheel the combination of a rim, a flexible cover or sheath and an inner inflatable tube, said cover or sheath being opened circumferentially on its inner side, and having circumferentially inextensible bands inserted or engaged with its edges and said bands being fitted and supported on said rim, and said rim having a medial band or ridge between said inextensible bands of the cover or sheath, said medial band or ridge having its outer periphery flush with the outer periphery of said bands of the cover or sheath so that a substantially continuous bed is formed for the inner tube, and fastening devices each comprising a rod mounted in a groove in said rim and held from outward movement by the ridge or band of the rim, and each of said fastening devices also comprising an engaging part or parts mounted on or forming part of said rod and constructed to prevent the lateral disengagement of one or both of said edges of the cover or sheath and to be moved out of engagement with said edge or edges to enable the tire to be displaced or removed, substantially as set forth.

This specification signed and witnessed this 28th day of December, 1893.

STERLING ELLIOTT.

In presence of—
WILLIAM A. REDDING,
ARTHUR H. BRONSON.